United States Patent [19]

Nagaura

[11] Patent Number: 4,687,716
[45] Date of Patent: Aug. 18, 1987

[54] ORGANIC ELECTROLYTE CELL

[75] Inventor: Toru Nagaura, Koriyama, Japan

[73] Assignee: Sony Corporation, Tokyo, Japan

[21] Appl. No.: 891,152

[22] Filed: Jul. 31, 1986

[30] Foreign Application Priority Data

Jul. 31, 1985 [JP] Japan .................. 60-169215

[51] Int. Cl.$^4$ .............................. H01M 2/16
[52] U.S. Cl. ..................... 429/145; 429/66; 429/194
[58] Field of Search .......... 429/66, 194, 145, 197, 429/218

[56] References Cited

U.S. PATENT DOCUMENTS 4,268,588  5/1981  Lecerf et al. ............... 429/194
4,336,315  6/1982  Eda et al. ................... 429/194

FOREIGN PATENT DOCUMENTS 0154772  9/1982  Japan .......................... 429/194
0189463  11/1982 Japan .......................... 429/66

Primary Examiner—Donald L. Walton

[57] ABSTRACT

An organic electrolyte cell included an anode composed mainly of lithium, a cathode and an organic electrolyte solution. There are interposed between the anode and the cathode a layer of a powdered material for holding the electrolyte solution therein and a microporous film having numerous micro size pores the ions can pass through.

4 Claims, 13 Drawing Figures

ORGANIC ELECTROLYTE CELL

BACKGROUND OF THE INVENTION

1. Field of the Invention

This invention relates to an organic electrolyte cell making use of lithium as anode and of an organic solvent in the electrolyte solution.

2. Description of the Prior Art

An organic electrolyte cell employing as anode active material metal lithium having high electronegativity has been known as one of the cells showing various superior properties such as showing a cell voltage as high as 3 V because of the extremely low electrode potential of metal lithium and a higher energy density of the cell because of the larger electric capacity per unit weight of metal lithium. Accordingly, the application or usage of the organic electrolyte cell has been increased in recent years as a back-up power source for electronic watches or IC memories that demand high reliability for a long period of time.

As shown in FIG. 10, the aforementioned organic electrolyte cell is composed of metal lithium 101 which is an anode active material, cathode pellet 102 formed of cathode active material, a separator 103 impregnated with an organic electrolyte and disposed between the metal lithium 101 and the pellet 102, an anode cup 104 and a cathode cup 105 sealing the overall unit.

The aforementioned organic electrolytic solution may for example consist of an electrolyte such as lithium perchlorate ($LiClO_4$) or lithium borofluoride ($LiBF_4$) disolved in a solvent system consisting in turn of one or more of solvents such as propylen carbonate, 1,2-dimethoxyethane, gammabutyrolactone or tetrahydrofuran. The cathode pellet 102 may consist of one or more of carbon fluoride ($CF_4$), manganese dioxide ($MnO_2$), copper oxide ($CuO$), iron disulfide ($FeS_2$), silver chromate ($Ag_2CrO_4$) or titanium disulfide ($TiS_2$) mixed together with an electro-conduction assistive agent such as graphite or a binder such as tetrafluoroethylene.

It is noted that, in the aforementioned organic electrolyte cell, an important role of the organic electrolytic solution is to provide for satisfactory ionic conduction between the anode or metal lithium 101 and the cathode or cathode pellet 102. It is for this reason that polypropylene non-woven cloth superior in liquid resistance and liquid holding properties is widely used as the separator 103 designed for such ionic conduction as well as electrical separation between the anode and the cathode.

However, the organic electrolyte cell such as described has a drawback that the internal resistance thereof increases with the progress in discharge. This is probably ascribable to the fact that, no matter which of the aforementioned cathode active materials is employed, discharge products are accumulated at the cathode as the discharge proceeds such that, as shown in FIG. 11, the cathode is markedly swollen to compress the separator 103 formed of the non-woven cloth then squeeze out the electrolyte solution held in the separator 103 with resulting obstruction of the ionic conduction between the anode and the cathode. Such increase in the internal resistance impedes effective utilization of the cell such that, when a larger pulse current is produced in the latter or terminal stage of the discharge process, the cell voltage is significantly lowered due to the high internal resistance with the result that, for an application or usage that demands larger pulse current, it is occasionally not possible to make an effective use of the cell capacity.

The separator formed of the non-woven cloth as mentioned hereinabove plays an important role of holding a sufficient amount of the electrolyte solution between the cathode and the anode to provide for good ionic conduction, and another important roll of completely isolating the anode and the cathode to prevent short-circuiting therebetween in the cell. However, it has a drawback that the liquid holding properties are deteriorated owing to the swelling of the cathode as the discharge proceeds.

SUMMARY OF THE INVENTION

The present invention has been made in view of the above described prior-art circumstances.

It is a principal object of the present invention to provide an organic electrolyte cell that undergoes only small rise in the resistance as the discharge proceeds and the capacity of which can be effectively exploited even in an application where large current pulses need be outputted from the cell.

This invention provides an organic electrolyte cell comprising an anode mainly formed of lithium, a cathode and an organic electrolyte solution, wherein there are interposed between the anode and the cathode a layer of a powdered material holding the electrolyte solution therein and a microporous film having numerous small size pores the ions can pass through, whereby to provide the organic electrolyte cell wherein the rise in the internal resistance accompanying the discharge process is prevented and the cell capacity can be used up effectively.

The organic electrolyte solution that provides for ionic conduction between the anode and the cathode in held in the interstices between the neighboring particles of the layer of the powdered material interposed between the cathode and the anode. In the layer of the powdered material, while the anode pellet should become swollen with the progress of discharging, the organic electrolyte solution held in the cell is not squeezed contrary to the case of using the non-woven cloth, but a sufficient amount of the organic electrolyte solution is held in the layer even during the terminal stage of the discharge process.

On the other hand, complete isolation between the cathode and the anode can be achieved through simultaneously using the microporous film. The microporous film has numerous micro size pores the ions can pass through so that ionic conduction between the anode and the cathode can take place smoothly.

DETAILED DESCRIPTION OF THE INVENTION

As a result of our eager research for prolonged time into reducing the rise in the internal resistance in the organic electrolyte cell, the present inventor has reached a conclusion that the solution to this problem can be obtained by having two different materials separately perform the role of holding the electrolyte solution and the role of isolating the anode and the cathode from each other.

On the basis of this finding, the present invention provides an organic electrolyte cell comprised of a cathode, an anode consisting essentially of lithium and an organic electrolytic solution, characterized in that there are interposed between the anode and the cathode a layer of powdered material for holding the aforementioned organic electrolytic solution and a microporous film having numerous micro size pores that permit the ions to pass therethrough.

Figure 1:
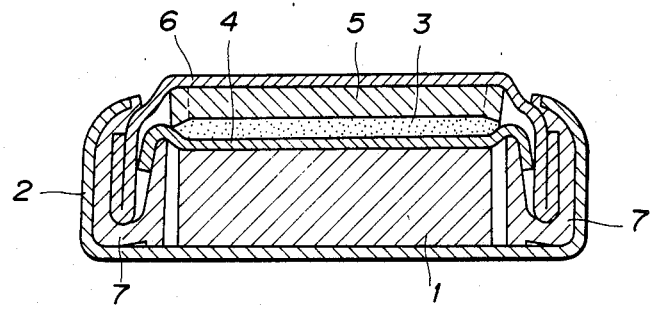
FIG. 1 is a sectional view showing an example of the organic electrolyte cell to which the present invention is applied.

FIG. 1 shows an organic electrolyte cell of the present invention in which, on top of the cathode cup 2 charged with cathode pellets 1, there is disposed, through the medium of a layer 3 of a powdered material holding the organic electrolytic solution therein and a microporous film 4, an anode cup 6 charged with metal lithium 5, and the opening part is hermetically sealed by means of gasket 7.

Figure 2:
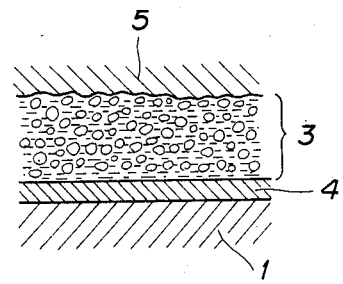
FIG. 2 is an enlarged sectional view showing the layer of the powdered material and the portions adjacent thereto.
Figure 3:
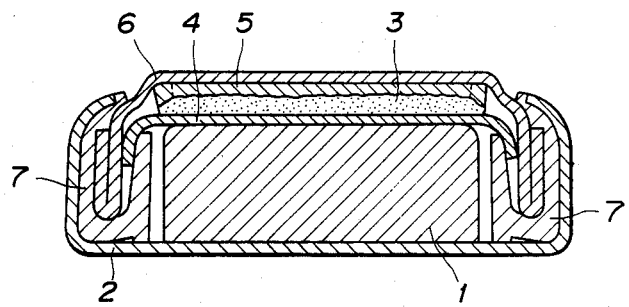
FIG. 3 is a sectional view showing the organic electrolyte cell of the present invention with the cathode being swollen.

As shown to a large scale in FIG. 2, the layer 3 of the powdered material is composed of numerous particles with interstices between the adjoining particles. The organic electrolyte solution is held in these interstices between these particles.

The role of the layer 3 of the powdered material is to hold the organic electrolyte solution in the interstices between the adjoining particles of the powdered material. Therefore, any powdered material can be used if it has liquid resistance with respect to the organic electrolyte solution employed as the electrolyte for the cell. Since the isolation between the anode or the metal lithium 5 and the cathode or cathode pellet 1 is achieved by the microporous film to be later described, it is not always necessary that the powdered material have insulating properties. Therefore, metal powders such as nickel powders can be used as the aforementioned powdered material. It can also be selected from a wide variety of materials such as insulators including powdered inorganic materials or plastic powders.

Alternatively, aluminium can be applied and laminated to metal lithium 5 to react lithium and aluminium to produce a powdered lithium-aluminium alloy which can be used as the layer of the powdered material.

Since the isolation properties of the layer 3 of the powdered material against electrical shorting between the both electrodes, that is, metal lithium 5 and the cathode pellet 1, the aforementioned microporous film 4 is simultaneously used in accordance with the present invention in order to provide for complete isolation between the anode and the cathode.

The microporous film 4 has a smooth surface and an extremely small thickness of 20 to 80 microns and provides for complete isolation between the anode and the cathode, although it has only poor liquid holding properties. Also the microporous film 4 has the numerous micro-size pores through which the ions can pass so that it does not interfere with ionic conduction between the cathode and the anode. As such microporous film, any commercially available products can be used, for example, the film produced and sold by Polyplastics Co., Ltd. under the trade name of "Duraguard".

According to the present invention, the organic electrolyte solution on the cathode active material commonly used in this type of the cell can be used as the cathode pellet 1 or as the organic electrolyte solution. Thus, one or more of carbon fluoride ($CF_x$), manganese dioxide ($MnO_2$), copper oxide (CuO), ion disulfide ($FeS_2$), silver chromate ($Ag_2CrO_4$) and titanium disulfide ($TiS_2$) mixed with the electro-conduction assistive agent such as graphite or with the binder such as tetrafluoroethylene is used as the cathode pellets. The electrolytes such as lithium perchlorate ($LiClO_4$) or lithium borofluoride ($LiBF_4$) dissolved in one or more of propylene carbonate, 1,2-dimethoxyethane, gamma-butyrolactone, tetrahydrofuran and 1,3-dioxolan, these solvents being either taken singly or as a mixture as desired.

It is seen from the foregoing that, according to the present invention, the electrolyte solution of the organic electrolyte cell is retained in the interstices between the adjoining particles of the powdered material of the layer which is interposed between the anode and the cathode. The layer of the powdered material does not become collapsed even if the cathode becomes swollen so that the capacity thereof in holding the electrolyte solution remains unchanged with the result that the internal resistance is prevented from rising with the progress in the discharge process. On the other hand, the isolation between the anode and the cathode is taken care of by a microporous film which is superior in the isolation properties thereof with respect to electrical short-circuiting and which has numerous micro-sized pores the ions can pass through so that it does not interfere with ionic conduction between the anode and the cathode.

In sum, the present invention provides an organic electrolyte cell which is excellent in discharge properties and subject to only a small rise in temperature and the capacity of which can be effectively used up even in such application in which larger pulse currents are taken from the cell.

The present invention will be explained further by referring to certain specific Examples thereof. It is to be noted however that these Examples are given only by way of illustration and are not intended to limit the scope of the present invention.

EXAMPLE 1

To 88.9 wt. parts of the commercially available electrolytic manganese dioxide heat-treated at 300° C. for about 5 hours were added 9.3 wt. parts of graphite and 1.8 wt. parts of tetrafluoroethylene (trade name: Teflon) as the binder to give a cathode mix which was then worked into cathode pellets 15.5 mm in diameter and weighting 0.655 g.

Figure 4:
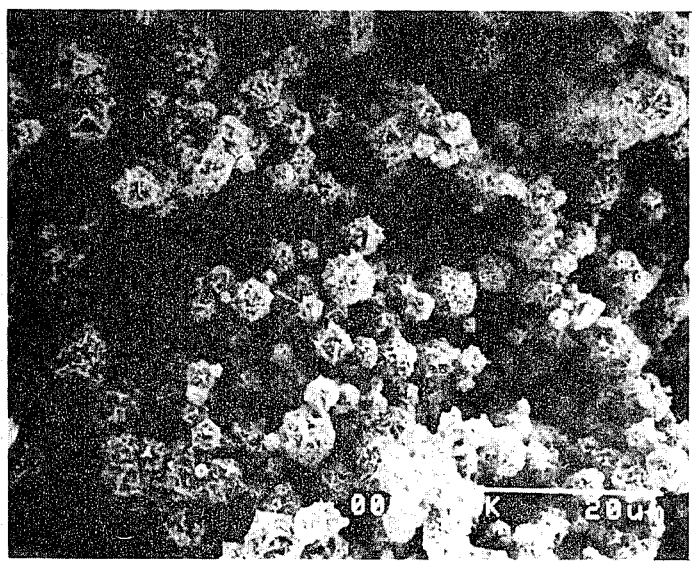
FIG. 4 is a photo showing the layer of the nickel metal powders used as the layer of the powdered material in a preferred embodiment of the invention, with the magnification factor being 1500.

Then, a circular piece 15.5 mm in diameter was punched out of a lithium foil 0.40 mm in thickness and bonded to an anode cup. The lithium foil strip was covered with a layer of nickel metal powders of the particle size of approximately 2 to 5 microns to a thickness of approximately 50 microns. In the layer of the nickel metal powders, the interstices between the neighboring particles were observed, as shown by the enlarged photo of FIG. 4 (magnification factor: 1500).

Further, on top of the layer of the nickel metal powders, there was placed a microporous film 25 microns in thickness, which is a porous polypropylene film manufactured and sold by the Polyplastc Co. Ltd. under the trade name of "Duraguard 2500". Plastic gaskets were placed in position and the electrolyte solution consisting of $LiClO_4$ dissolved in polypropylene carbonate at a concentration of 1 mol per liter was poured into the layer of the nickel powders.

Finally, the previously prepared cathode pellet was charged and covered with a cathode cup 2. After sealing, the organic electrolyte cell shown in FIG. 1 with a diameter of 20 mm and a height of 2.5 mm was assembled (Example 1).

On the other hand, after the lithium foil was bonded to the anode cup, a non-woven polypropylene cloth with a thickness of 300 microns was placed on the foil as a separator and plastic gasket was placed in position. The organic electrolyte cell was assembled in the same manner as in Example 1 (Comparative Example 1).

These organic electrolyte cells were subjected to continuous discharge at 1.5 kΩ for investigating into changes in the internal resistance and discharge characteristics thereof. The results are shown in FIGS. 5 and 6.

Figure 5:
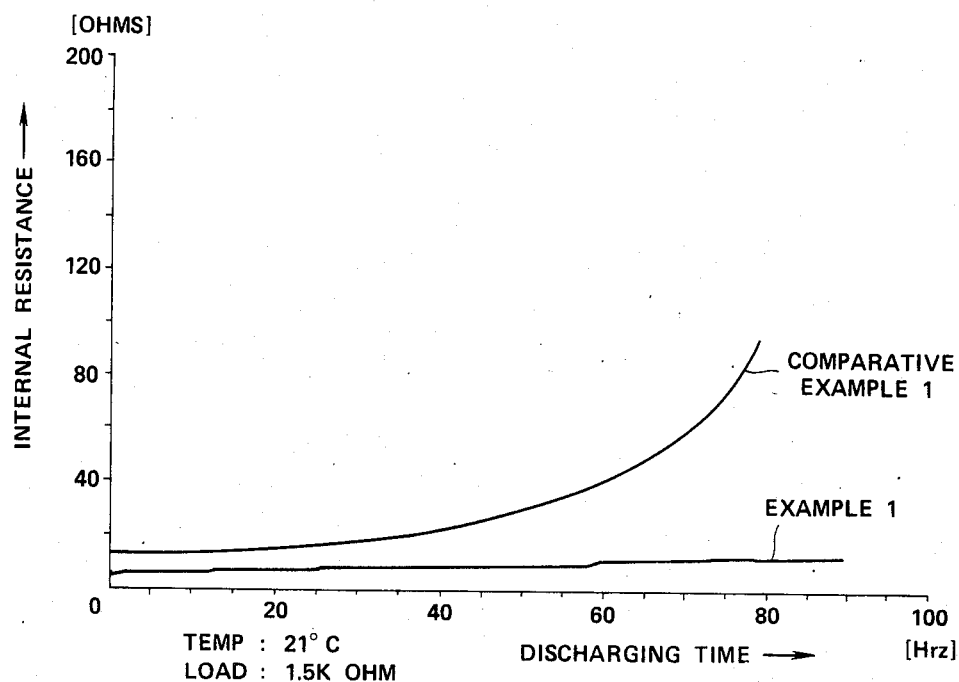
FIG. 5 is a diagram showing changes in the internal resistance in an embodiment of the present invention in contrast to those in a comparative example.
Figure 6:
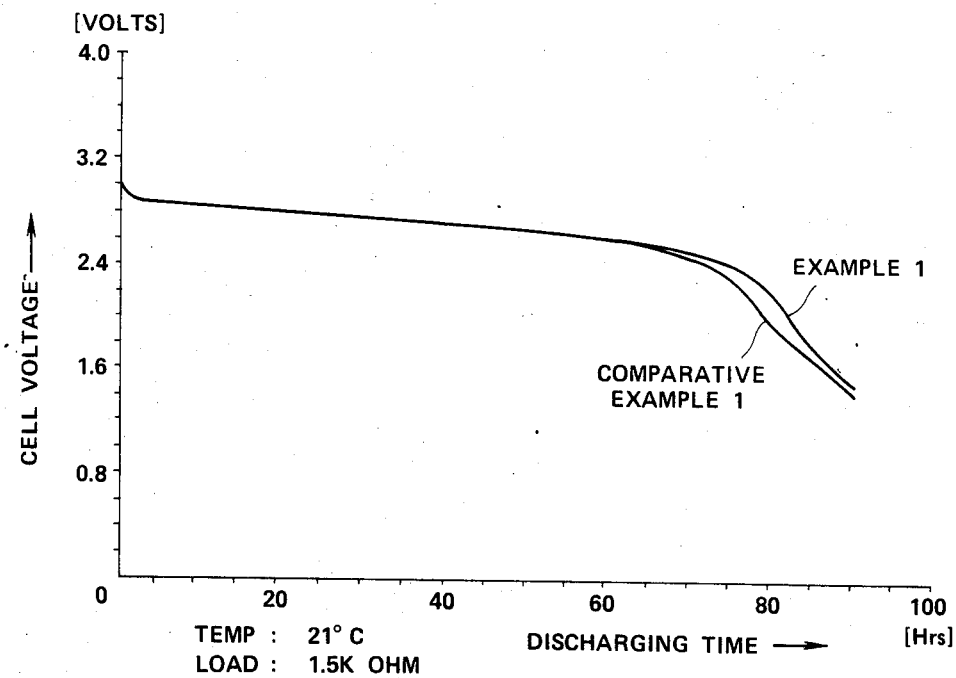
FIG. 6 is a diagram showing discharge properties of the same example in contrast to those of the comparative example.

It is seen from FIG. 5 that, while the internal resistance of the cell of the Comparative Example 1 rises significantly, the changes in the internal resistance of the cell of the Example 1 are extremely small and kept to a lower value even in the terminal stage of the discharge process. It is also seen from FIG. 6 that the cell of the Example 1 compares favorably with the cell of the Comparative Example 1 in the dischage properties, while showing a small increase in the discharge capacity.

EXAMPLE 2

A circular lithium strip 15.5 mm in diameter was punched from a lithium foil 0.4 mm in thickness and bonded to an anode cup. A circular aluminium strip of the same diameter was punched from an aluminium foil 15 microns in thickness and laminated to the lithium foil strip.

Two microporous films 25 microns in thickness (manufactured and sold by the Polyplastics Co., Ltd. under the trade name of "Duraguard 2500") were placed on the foils and plastic gasket was placed in position. The organic electrolyte cell was assembled in the same manner as Example 1 (Example 2).

Figure 7:
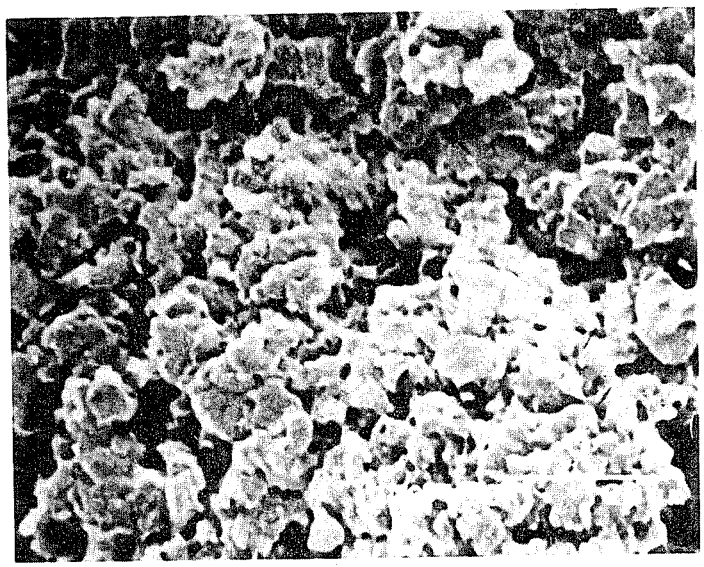
FIG. 7 is a photo showing the lithium-aluminium alloy powders that are formed upon laminating lithium to aluminium, with the magnification factor being 1500.

When lithium and aluminium are laminated to each other as in the present Example, these are reacted to produce a powdered Li-Al alloy for forming a layer of the powdered material on the residual lithium. As a matter of fact, our dismounting tests on several cell samples of the present Example have revealed that a layer of the powdered lithium-aluminium alloy is formed between the lithium strip and the microporous film to a thickness of approximately 30 to 40 microns. The cell structure of the present Example is as that shown in FIG. 1, similarly to the Example 1. FIG. 7 shows a photo (magnification factor: 1500) showing the layer of the powdered lithium-aluminium alloy that is formed between the lithium strip and the microporous film in the present Example. It is seen that the interstices exist between the adjoining particles and that the electrolyte solution is retained in these interstices.

Discharge tests have revealed that, in the present Example 2, the rise in the internal resistance caused by the discharge was extremely small, as in Example 1.

EXAMPLE 3

To 88.9 wt. parts of commercially available iron disulfide ($FeS_2$) were added 9.3 wt. parts of graphite and 1.8 wt. parts of tetrafluoroethylene (trade name: Teflon) as the binder to give a cathode mix which was then worked into cathode pellets each 6.7 mm in diameter and weighing 0.130 g.

A circular strip was punched to a diameter of 6.7 mm from a lithium foil 1 mm in thickness and affixed to an anode cup. An aluminium strip was similarly punched from an aluminium foil 0.015 mm in thickness and laminated to the lithium foil strip.

On these foil strips were placed two microporous films 25 microns thick, manufactured and sold by the Polyplastics Co., Ltd. under the trade name of "Duraguard 2500" and plastic gasket was placed inposition. Then the electrolyte solution of the same composition as that used in Example 1 and the previously prepared cathode pellet were charged in this order. The cathode cup is then applied and sealed to provide an organic electrolyte cell 9.50 mm in diameter and 2.70 mm in height (Example 3).

Our dismounting tests on several cell samples of the present Example have revealed that, as in the case of the preceding Example 2, a layer of the lithium-aluminium alloy powders is formed between the lithium foil and the microporous film to a thickness of approximately 30 to 40 microns, and that the cell structure is as shown in FIG. 1.

On the other hand, an organic electrolyte cell with a diameter of 9.50 mm and a height of 2.70 mm was assembled in the same manner as in Example 3, by bonding the lithium foil to the anode cup, then placing as separator a non-woven polypropylene cloth 200 microns in thickness on the lithium foil and then placing plastic gasket in position (Comparative Example 3).

These organic electrolyte cells were subjected to continuous discharge at 3 kΩ for investigating into changes in the internal resistance and discharge properties thereof. The results are shown in FIGS. 8 and 9.

Figure 8:
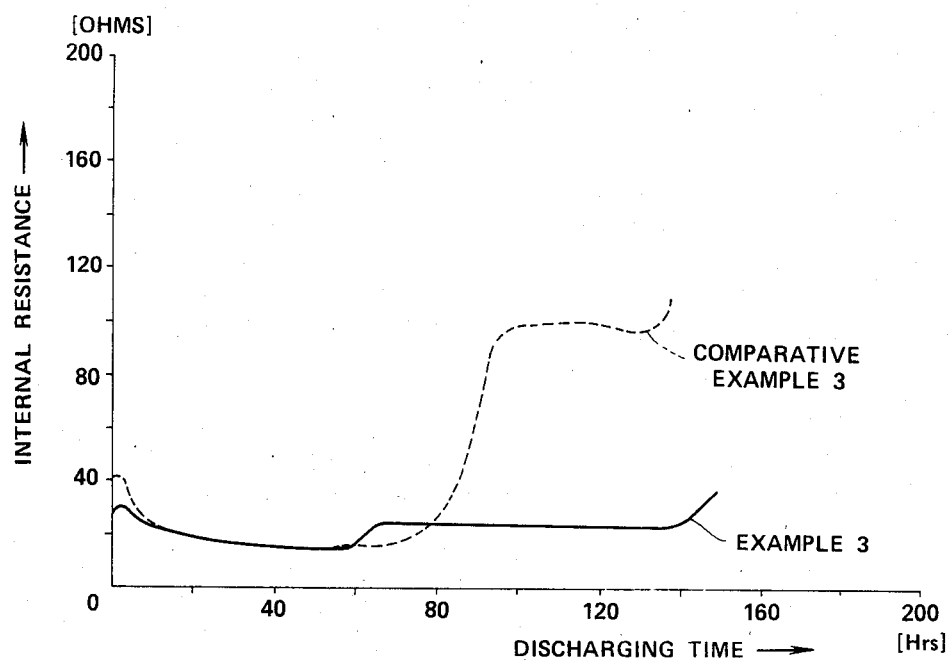
FIG. 8 is a diagram showing changes in the internal resistance in another example of the present invention in contrast to those in another comparative example.
Figure 9:
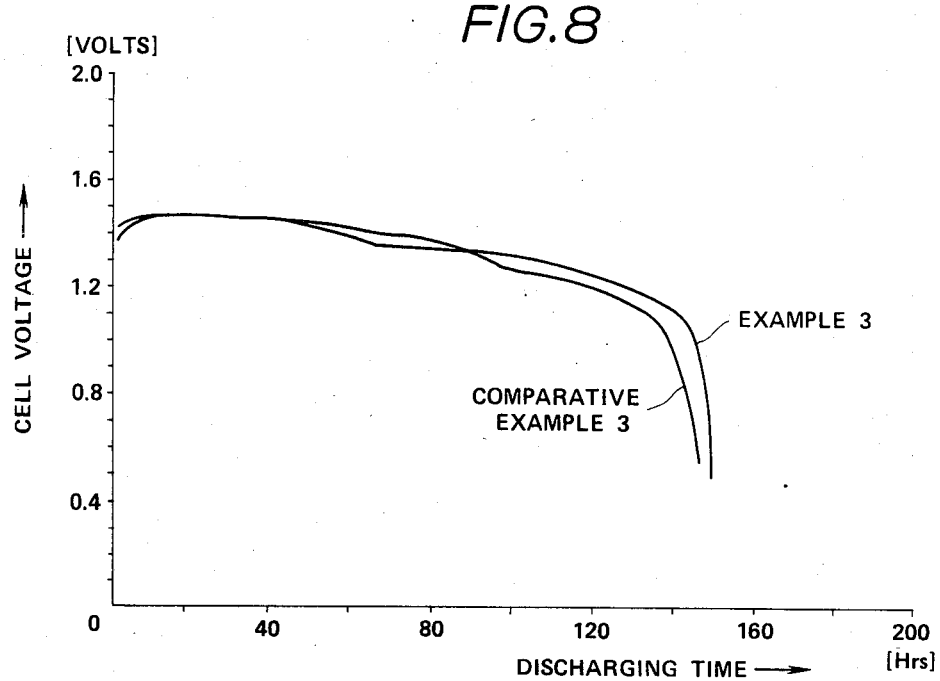
FIG. 9 is a diagram showing discharge properties of the same example in contrast to those of the same comparative.
Figure 10:
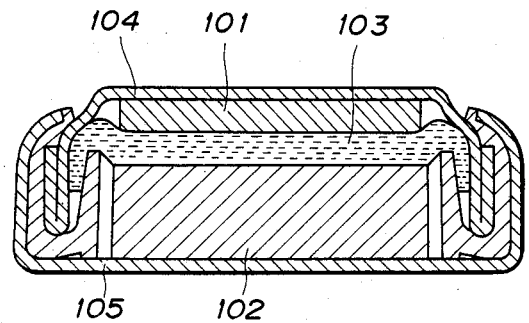
FIG. 10 is a sectional view showing the structure of the conventional organic electrolyte cell.
Figure 11:
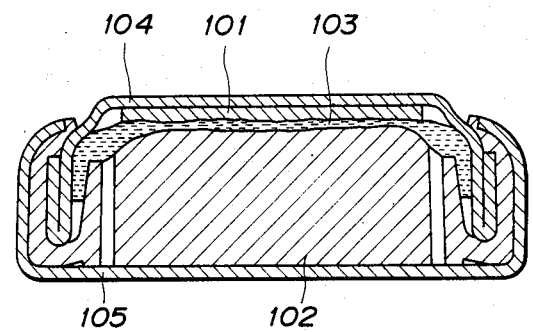
FIG. 11 is a sectional view showing the conventional organic electrolyte cell with the cathode becoming swollen.

It is seen from FIG. 8 that the present invention is also effective in the cell of the $Li/FeS_2$ system, and that changes in the internal resistance with discharge are extremely small in the case of the Example 3 as compared to the case of the Comparative Example 3. It is also seen from FIG. 9 that the cell of the Example 3 shows discharge properties not lower than those of the Comparative Example 3.

COMPARATIVE EXAMPLE 4

Figure 12:
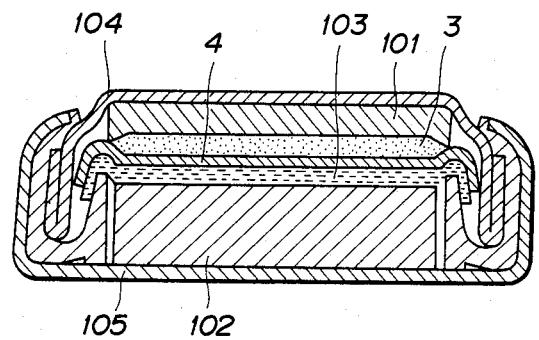
FIG. 12 is a sectional view showing a comparative example of the organic electrolyte cell.

A circular lithium strip was punched to a diameter of 15.5 mm from a lithium foil 0.40 mm in thickness and bonded to an anode cup. A circular aluminium strip was punched to the same diameter from a aluminium foil 15 mm in thickness and laminated to the lithium foil. On these foils were placed a microporous film 25 microns in thickness and a nonwoven polypropylene cloth 300 microns in thickness in this order and plastic gasket was placed in position. In this manner, an organic electrolyte cell was assembled as in the preceding Example 1 ( Comparative Example 4). FIG. 12 shows the thus prepared cell in cross-section.

Discharge tests of the cell of the Comparative Example 4 have revealed that the internal resistance of the cell rises markedly with discharge similarly to the Comparative Example 1.

Figure 13:
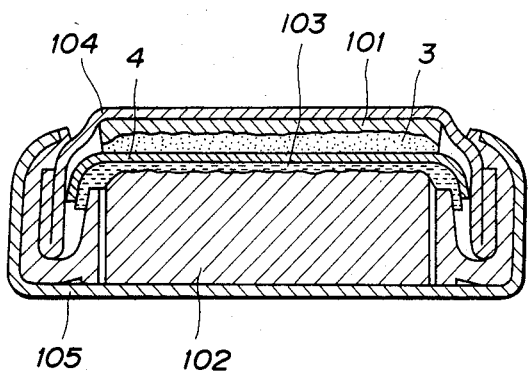
FIG. 13 is a sectional view showing the electrolyte cell with the cathode thereof becoming swollen.

Such rise in the internal resistance may be explained as follows. Referring to FIG. 13, discharge products are accumulated at the cathode with the progress in discharge so that the cathode becomes swollen markedly. The electrolyte solution held in the layer of the powdery material is squeezed out due to compression of the non-woven polypropylene cloth caused by cathode swelling thus interfering with the ionic conduction.

Although the present invention has been described with reference to the specific examples of making use of manganese dioxide and iron disulfide as the cathode active material, the present invention is not limited thereto but may be applied to any other types of the organic electrolyte cells.

What is claimed is:

1. An organic electrolyte cell comprising:
an anode mainly formed of lithium;
a cathode;
an organic electrolyte;
a layer of powder material holding said organic electrolyte therein;
a micro porous film adjacently provided to said layer of powder material having a plurality of micro size pores permitting of ions of said organic electrolyte to pass therethrough;
said layer of powder material and said micro porous film being provided adjacently between said anode and said cathode.

2. An organic electrolyte cell comprising:
an anode can;
an anode mainly formed of lithium;
an organic electrolyte;
a layer of powder material provided adjacent to said anode holding said organic electrolyte therein;
a micro porous film provided adjacent to said layer of powder material permitting of ions of said organic electrolyte to pass therethrough;
a cathode provided adjacent to said micro porous film and cathode can,
said anode, said organic electrolyte, said layer of powder material, said micro porous film and said cathode being sealed in said anode can and said cathode can.

3. An organic electrolyte cell according to claim 1 or 2, said powder material is powder of lithium aluminium alloy.

4. An organic electrolyte cell according to claim 1 or 2, said micro porous film has a thickness between 20 m and 80 m.

* * * * *